United States Patent [19]
Palmer et al.

[11] 4,316,183
[45] Feb. 16, 1982

[54] LIQUID LEVEL SENSOR

[75] Inventors: Stuart B. Palmer, Hull; Gregory J. Primavesi, Theale, both of England

[73] Assignee: Bestobell Mobrey Limited, Slough, England

[21] Appl. No.: 200,519

[22] Filed: Oct. 24, 1980

[51] Int. Cl.³ .................... G08B 21/00; G01F 23/00
[52] U.S. Cl. ................................... 340/621; 73/290 V
[58] Field of Search .............. 340/618, 621; 73/290 V

[56] References Cited

U.S. PATENT DOCUMENTS

| | | | |
|---|---|---|---|
| 2,713,263 | 7/1955 | Turner | 73/290 V |
| 2,787,160 | 4/1957 | Van Valkenburg | 73/290 V |
| 3,266,311 | 8/1966 | Andreasen et al. | 340/621 X |
| 4,118,983 | 10/1978 | Brazhnikov | 340/621 X |
| 4,213,337 | 7/1980 | Langdon | 340/621 X |

FOREIGN PATENT DOCUMENTS

| | | | |
|---|---|---|---|
| 809681 | 3/1959 | United Kingdom | 340/621 |
| 422967 | 9/1974 | U.S.S.R. | 73/290 V |
| 537253 | 12/1976 | U.S.S.R. | 73/290 V |

*Primary Examiner*—John W. Caldwell, Sr.
*Assistant Examiner*—Daniel Myer
*Attorney, Agent, or Firm*—Kane, Dalsimer, Kane, Sullivan & Kurucz

[57] ABSTRACT

A high liquid level sensor comprising a tubular probe, with a peripheral wall (6), and arranged to be suspended in a liquid container. An ultrasonic signal is transmitted around the wall (6) from a transmitting transducer (12) potted in a block (11), which is bonded to the inner surface of the wall, to a receiving transducer also potted in the block. A detector circuit connected to the receiving transducer via a lead (10) discriminates between the signal level when the probe is immersed in gas and the lower signal level when the probe is immersed in liquid, and provides a corresponding switched output.

10 Claims, 5 Drawing Figures

LIQUID LEVEL SENSOR

The invention relates to liquid level sensors of the kind which are used with liquid containers and provide an electrical signal representative of the presence of liquid at an adjacent level in the container.

Historically such sensors have been made in the form of float operated switches but these involve moving parts which are subject to friction and wear. More recently ultrasonic sensors have been used. These typically involve the transmission across a gap of an ultrasonic signal, the signal being transmitted from a transmitting transducer across a gap towards a receiving transducer, the signal being received at the receiving transducer when liquid is present in the gap but not when air is present in the gap. Generally, failure in the electronics, in the piezoelectric or other transducer or in the cables produces a lack of signal from the receiving transducer, which is the normal failure mode, and appears to indicate a dry or no liquid present state. In various applications it is an advantage to have the failure mode to correspond to the same state as when liquid is present in the gap. For example, for high level alarms in tanks and boilers, it is desirable to make the fault condition equivalent to an alarm condition. This is particularly necessary for high level alarms on chemical tanks on board ships.

It has previously been proposed to propagate ultrasonic shear waves in the wall of a liquid-carrying pipe in order to transmit a portion of the signal into the liquid and to obtain a reflected signal, as a result of the Doppler affect, from the moving liquid and hence obtain a measurement of the flow velocity along the pipe. There are also vague references in the literature to measuring liquid level based on excess attenuation of an ultrasonic shear wave propagated over a zig-zag path in a wall but these have included no detail of how this may be achieved to provide a practical fail safe high level alarm.

In accordance with the present invention, a liquid level sensor comprises a hollow probe which has a tubular peripheral wall made of a material capable of conducting an ultrasonic signal and which is arranged to be fitted to a liquid container with at least the outer surface of the peripheral wall exposed to the interior of the container; a transmitting transducer and a receiving transducer accommodated within the probe and coupled to the inner surface of the peripheral wall at angularly spaced positions so that an ultrasonic signal can be transmitted from the transmitting transducer to the receiving transducer along a path around the peripheral wall; means for energising the transmitting transducer; and means coupled to the receiving transducer for distinguishing between a level of received signal corresponding to exposure of the peripheral wall to liquid and a level of received signal corresponding to exposure of the peripheral wall to gas, and for producing a corresponding electrical output.

The invention is based on the appreciation that at a solid/liquid interface there is a mismatch of the ultrasonic impedence of the two media. If an ultrasonic wave is present in the solid at such an interface, some of the ultrasonic energy is transmitted into the liquid. At a solid/gas interface the mismatch of the ultrasonic impedence of the two media is very much greater than that with a solid/liquid interface. Virtually no energy is transmitted through the interface into the air or other gas. With a construction in accordance with the invention therefore a low signal at the receiving transducer indicates liquid presence on the outside of the probe, and a high signal liquid absence, so that under failure conditions, which is normally a lack of signal received, the sensor indicates an apparent liquid presence. This is the desired failure mode for a high level alarm. Electronics of conventional design may be used to detect the difference between the signal received when the probe wall is immersed in air and immersed in liquid and this difference is large enough to be greater than any other effects caused by drift of electronic components characteristics, temperature, and transducer ageing. The system is also substantially fail safe in respect of any drift or residue on the external wall surface of the probe and of discontinuities in the liquid.

The ultrasonic signal will be directed from the transmitting transducer through the radially inner surface of the peripheral wall and be propagated around the wall. The exact manner of propagation of the signal in the wall is not entirely certain but it is believed to be in the form of a plate or Lamb wave corresponding to surface waves around both the inner and outer surfaces of the wall. Plate waves may be considered to include longitudinal and shear wave components and according to the theory each of these modes is partially converted to the other upon reflection at an interface. In spite of the complexity of the propagation theory, the peripheral wall is found effectively to act as a wave guide from which ultrasonic energy is lost to an extent depending upon the medium in contact with the outer surface of the wall. As a purely pictorial representation however it is convenient to imagine the ultrasonic signal being transmitted around the wall along a zig-zag path involving multiple internal reflections at the radially inner and outer surfaces of the wall.

At least the transmitting transducer is preferably a P-wave transducer, that is one which primarily transmits longitudinal waves.

The tubular construction of the probe in accordance with the invention is particularly advantageous. Thus the probe is a self-contained unit which is sealed to and suspended, e.g. from the top wall of the container so as to provide a sealed, clean and robust housing for the transducers and their lead wires which will normally extend in a sealed conduit out through the top wall of the container to associated electronic equipment. The transmission of the ultrasonic signal around the peripheral wall of the probe enables an appreciably long transmission path in a compact construction so that the probe takes up comparatively little space within the container. Thus the transmitting and receiving transducers may be so angularly spaced that the path extends through 180° or more circumferentially around the peripheral wall of the probe from the transmitting transducer to the receiving transducer. Both transducers may be potted in a common body of, for example, epoxy resin, bonded to the inner surface of the peripheral wall. This maximizes the length of a single transmission path from the transmitting transducer to the receiving transducer. Alternatively, however, the transmitting and receiving transducers could be mounted separately at diametrically opposite positions on the inner surface of the peripheral wall so that two similar transmission paths are provided in different directions around the wall from the transmitting transducer to the receiving transducer. The full circumference of the wall is thus used for the transmission of the signal, thereby providing greater sensitivity of signal attenuation.

The transmitting and receiving transducers are preferably both piezoelectric crystals, and may be substantially identical to one another. When the signal is to be propagated along a single path in one direction around the peripheral wall, the two transducers are preferably bonded to the inner surface of the peripheral wall at relative orientations so that they preferentially transmit the ultrasonic signal in the peripheral wall along the path, and receive an ultrasonic signal approaching along the path, respectively. In other words the transducers will be mounted so that their axis of signal propagation/reception is inclined to the normal to the inner surface of the peripheral wall, in a plane perpendicular to the axis of the tubular peripheral wall. At least the transmitting transducer is preferably so oriented that the ultrasonic signal leaves the transducer at an angle of between 2° and 15°, preferably substantially 5°, to the normal to the adjacent part of the radially inner wall surface.

Best results appear to be obtained when the peripheral wall is made of stainless steel having a thickness in the range of between 1.5 and 7.5 mm., and the transmitting transducer produces an ultrasonic signal at a frequency of 0.5–5 MHz. The peripheral wall may then have an external diameter as small as between 2 and 10 cm. This arrangement ensures that there are not too few notional reflections to provide adequate attenuation of the signal, nor so many notational reflections that the signal received by the receiving transducer has too low a signal to noise ratio.

The ultrasonic signal may be a continuous or a pulsed signal. The receiving and transmitting transducers may be connected by a feedback loop incorporating an amplifier which ensures self energization of the transmitting transducer in the liquid absent condition.

An example of a sensor constructed in accordance with the invention is illustrated diagrammatically in the accompanying drawings, in which.

Figure 1:
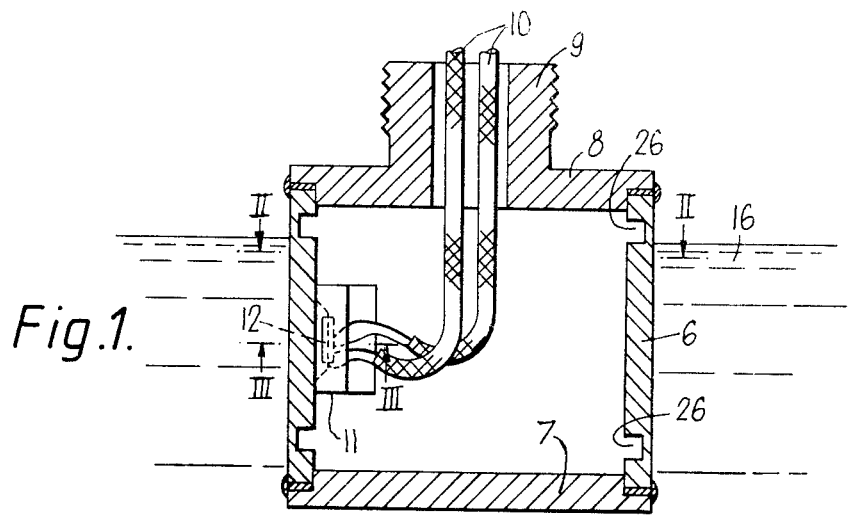
FIG. 1 is a vertical axial section taken on the line I—I in FIG. 2.

The sensor probe comprises a pressure tight stainless steel housing having a tubular peripheral wall 6 with a thickness of about 5 mm., a bottom wall 7, and a top wall 8 forms integrally with, or welded to, a screw threaded boss 9. The probe is intended to be sealed to and suspended from the top wall of a liquid container, for example by the boss 9 screwing into a complementary screw threaded bore extending through the container top wall, or by the boss 9 screwing into the bottom of a suspension tube which is itself sealed to and extends through the container top wall, or by the boss being welded to the container top wall or suspension tube. Lead wires 10 then extend down through the top wall of the container and through the boss 9 into the interior of the housing which is completely isolated from the liquid containing interior of the container.

Within the housing the lead wires 10 are connected to a transducer assembly comprising a block of epoxy resin which is bonded with a similar material to the inner surface of the peripheral wall 6 and in which are embedded transmitting and receiving piezoelectric transducers 12 and 13 respectively.

Figure 2:
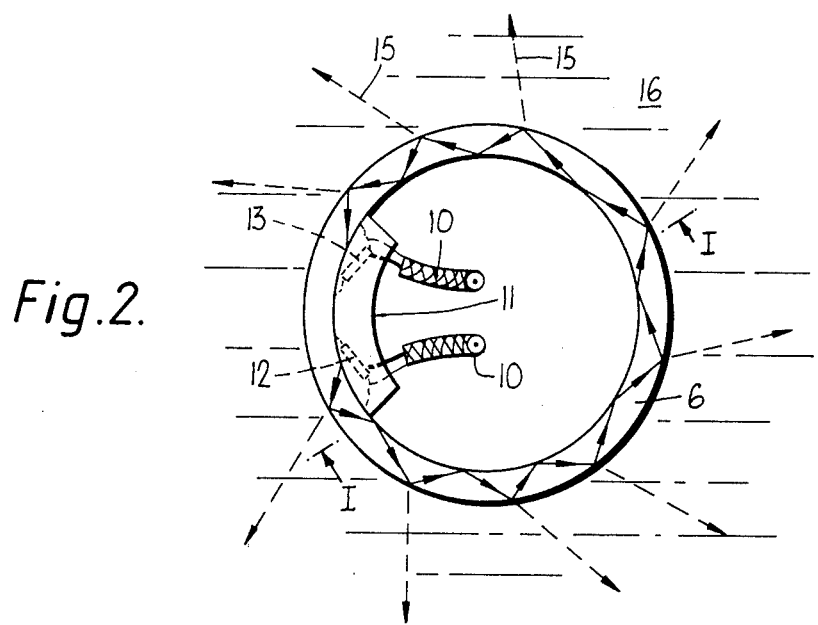
FIG. 2 is a section taken on the line II—II in FIG. 1.
Figure 3:
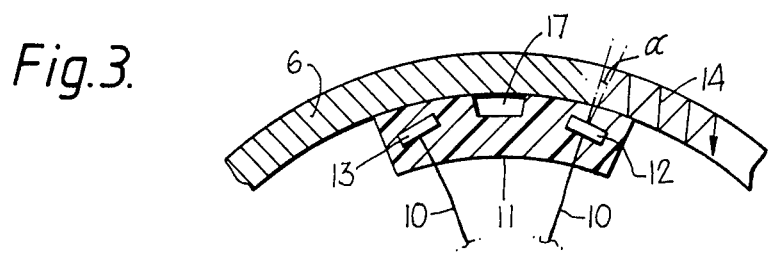
FIG. 3 is a section taken on the line III—III in FIG. 1.

As particularly shown in FIG. 3, the axes of transducers are inclined to the normal to the inner surface of the peripheral wall 6. As a result, when the transmitting transducer 12 is energized, it transmits an ultrasonic signal preferentially in one direction around the peripheral wall 6, the signal following a notional zig-zag path 14 with multiple internal reflections at the inner and outer surfaces of the wall. The angle α between the axis of the transmitting transducer, i.e. the direction in which the signal is initially propagated and the normal to the inner wall surface is approximately 5°. The receiving transducer 13 is similarly oriented preferentially to receive the signal after transmission around the majority of the circumference of the wall 6. The number of reflections shown in FIG. 3, and particularly in FIG. 2, is considerably less than those which occur in practice. As shown in FIG. 2, a proportion of the acoustic energy 15 passes out through the outer surface of the wall 6 into surrounding liquid 16 when the probe is immersed in liquid. However, when the liquid level in the container falls below the probe, so that the peripheral wall of the probe at the height of the transducers 12 and 13 is exposed to gas, the signal is almost totally internally reflected at the outer surfaces of the peripheral wall and there is minimum loss of acoustic energy.

The signal is deterred from short circuiting through the top and bottom walls 8 and 7 by two annular grooves 26 in the radially inner surface of the peripheral wall 6. The grooves reduce the wall thickness at these areas to about 1 mm.

As shown in FIG. 3, the body 11 of epoxy resin is somewhat U-shaped to provide a recess 17 in its radially outer surface, which assists in isolating the two transducers 12 and 13 from one another.

Figure 4:
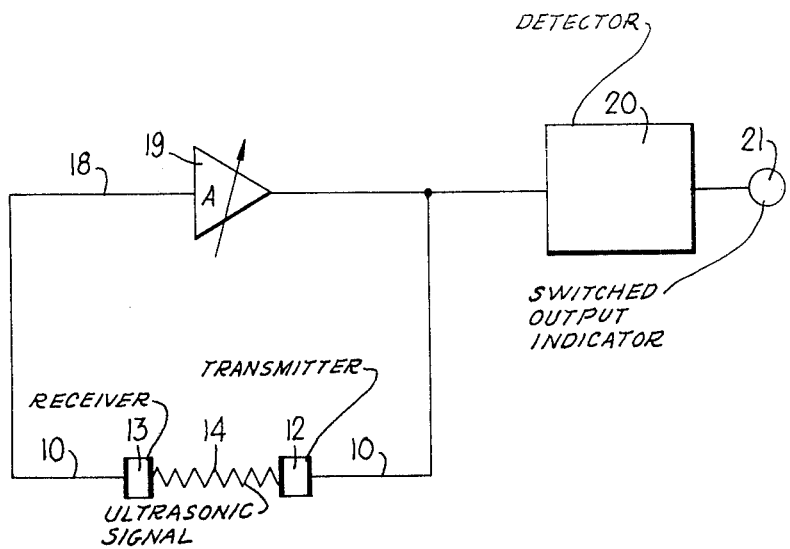
FIGS. 4 and 5 show alternative associated electrical circuit diagrams.

FIG. 4 shows one form of associated control circuit for the probe. In this case the receiving transducer 13 is connected to the transmitting transducer 12 via a feedback loop 18 incorporating the leads 10, and also a variable gain amplifier 19. The amplifier gain is set so that when the probe is immersed in gas, the attenuation of the ultrasonic signal 14 is small so that the electrical signal output of the receiving transducer 13 is sufficient to energize the transmitting transducer 12 whereby the circuit is self energizing. Similarly when the probe is immersed in liquid, the attenuation of the ultrasonic signal 14 is so great that the electrical signal leaving the receiving transducer 13 is insufficient to maintain oscillation of the circuit. The presence or absence of oscillation in the circuit is detected by a detector 20 which provides a switched output 21.

Figure 5:
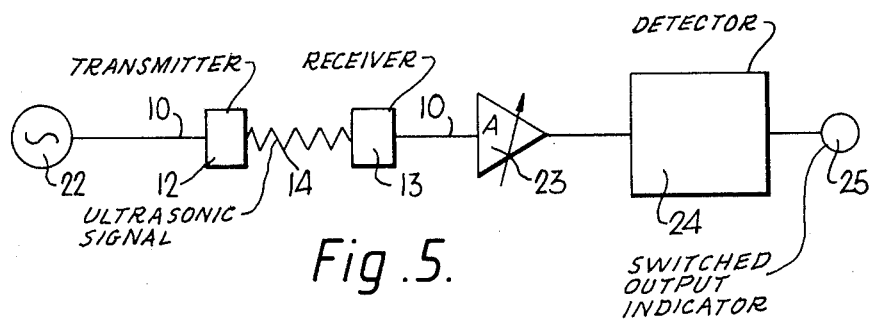

FIG. 5 shows an alternative control circuit without a feedback loop. In this case the transmitting transducer 12 is energized from a source 22 which may be a continuous or a pulsed source so that the ultrasonic signal transmitted along the path is similarly continuous or pulsed. The output from the receiving transducer 13 is fed via a variable gain amplifier 23 to a detector 24 which detects the level of electrical signal and discriminates between the level corresponding to attenuation of the signal 14 when the probe is immersed in liquid and that corresponding to attenuation of the signal 14 when the probe is immersed in gas. The detector 24 then provides a switched output 25 to indicate the presence or absence of liquid at the probe level.

We claim:

1. A liquid level sensor comprising a hollow probe which has a tubular peripheral wall with radially inner and outer surfaces and made of a material capable of conducting an ultrasonic signal and which is adapted to be fitted to a liquid container with at least said outer wall surface exposed to the interior of said container; a transmitting transducer and a receiving transducer accommodated within said probe and coupled to said inner wall surface at angularly spaced positions so that an ultrasonic signal can be transmitted from said transmitting transducer to said receiving transducer along a path around said peripheral wall; means for energizing said transmitting transducer; and means coupled to said receiving transducer for distinguishing between a level of received signal corresponding to exposure of said peripheral wall to liquid and a level of received signal corresponding to exposure of said peripheral wall to gas, and for producing a corresponding electrical output.

2. A sensor according to claim 1, wherein said peripheral wall is made of stainless steel having a thickness of between 1.5 and 7.5 mm; and said transmitting transducer produces an ultrasonic signal at a frequency of between 0.5 and 5 MHz.

3. A sensor according to claim 2, wherein said peripheral wall has an external diameter of between 2 and 10 cm.

4. A sensor according to claim 1, wherein said peripheral wall is provided at both axial sides of said signal path with annular grooves which reduce the thickness of said wall.

5. A sensor according to claim 1, wherein said transmitting and receiving transducers are piezoelectric crystal transducers and at least said transmitting piezoelectric transducer is a P-wave transducer.

6. A sensor according to claim 1, wherein said transmitting and receiving transducers are bonded to said inner wall surface at relative orientations such that they preferantially transmit said ultrasonic signal in said peripheral wall along said path, and receive said ultrasonic signal approaching along said path, respectively.

7. A sensor according to claim 6, wherein said transmitting transducer is so oriented and coupled to said peripheral wall that said ultrasonic signal leaves said transmitting transducer at an angle of between 2° and 15° to the normal to the adjacent part of said inner wall surface.

8. A sensor according to claim 1, wherein said transmitting and receiving transducers are closely angularly spaced and said path extends through more than 180° circumferentially around said peripheral wall from said transmitting transducer to said receiving transducer.

9. A sensor according to claim 8, wherein said transmitting and receiving transducers are potted in a common body of epoxy resin.

10. A sensor according to claim 1, wherein said energizing means and said level distinguishing means are adapted to provide an output representing the presence or absence of liquid in contact with said outer wall surface, and comprise a feedback loop interconnecting said receiving and transmitting transducers, said feedback loop incorporating an amplifier which ensures energization of said transmitting transducer in the liquid absent condition.

* * * * *